Figure 19:
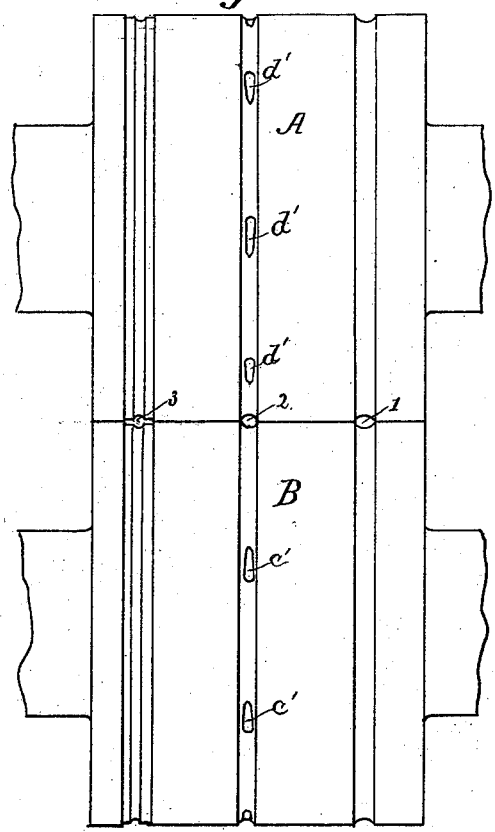

(No Model.)  F. H. TREAT.  3 Sheets—Sheet 1.
ROLLING MILL FOR ROLLING LEAFED WIRE FOR THE MANUFACTURE OF BARBED WIRE.
No. 314,082.  Patented Mar. 17, 1885.
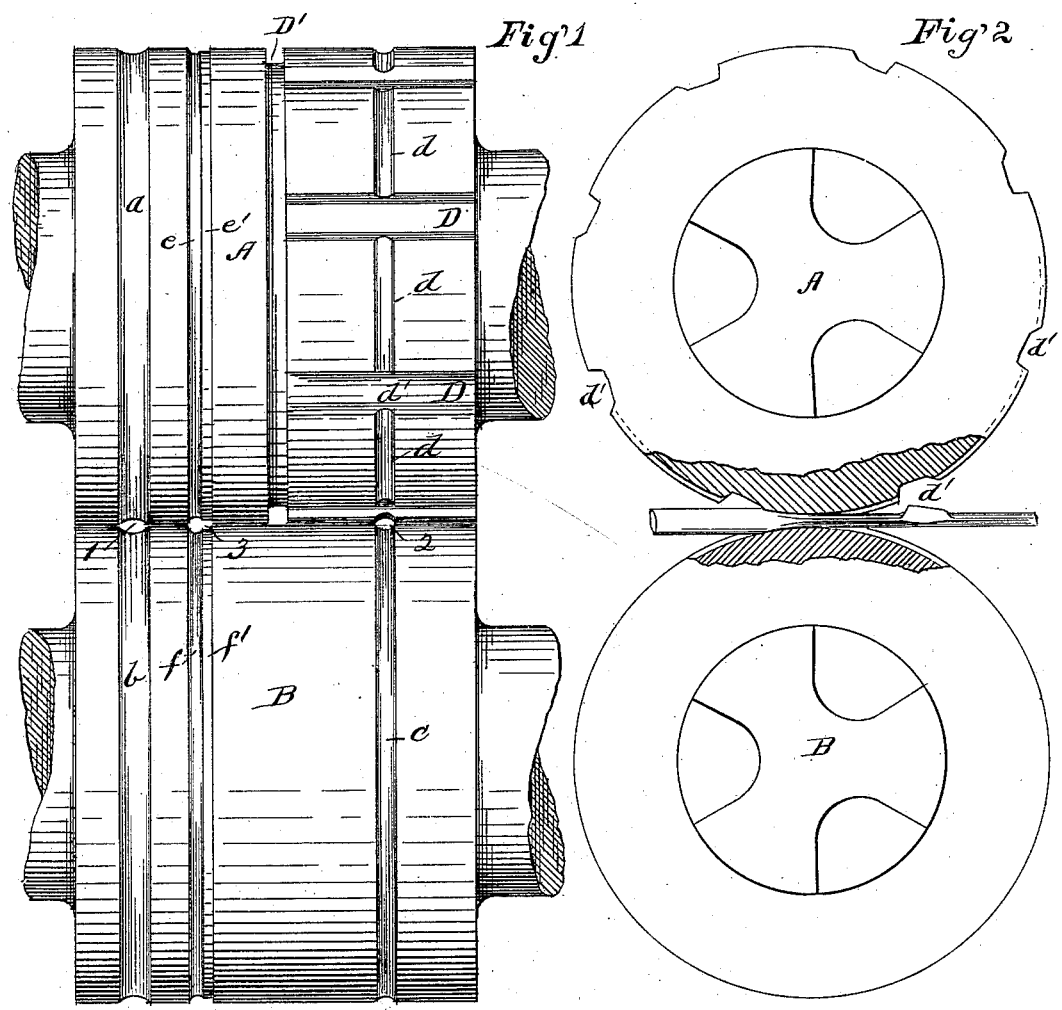
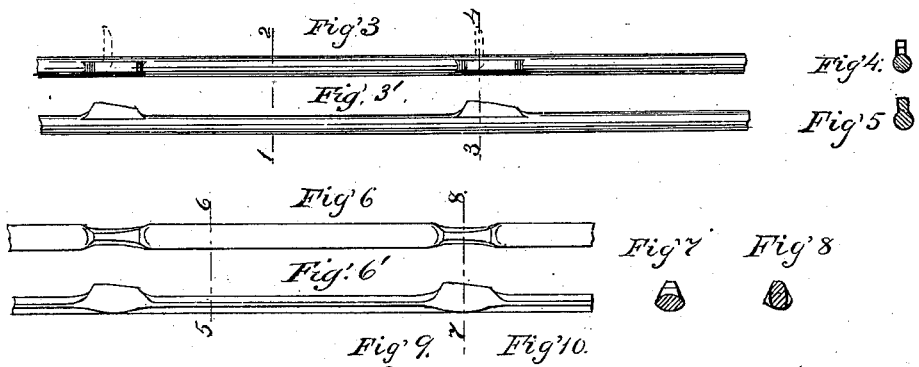
Witnesses:
A. C. Fairchild
Inventor:
Francis H. Treat (No Model.) F. H. TREAT. 3 Sheets—Sheet 2.
ROLLING MILL FOR ROLLING LEAFED WIRE FOR THE MANUFACTURE OF BARBED WIRE.
No. 314,082. Patented Mar. 17, 1885.
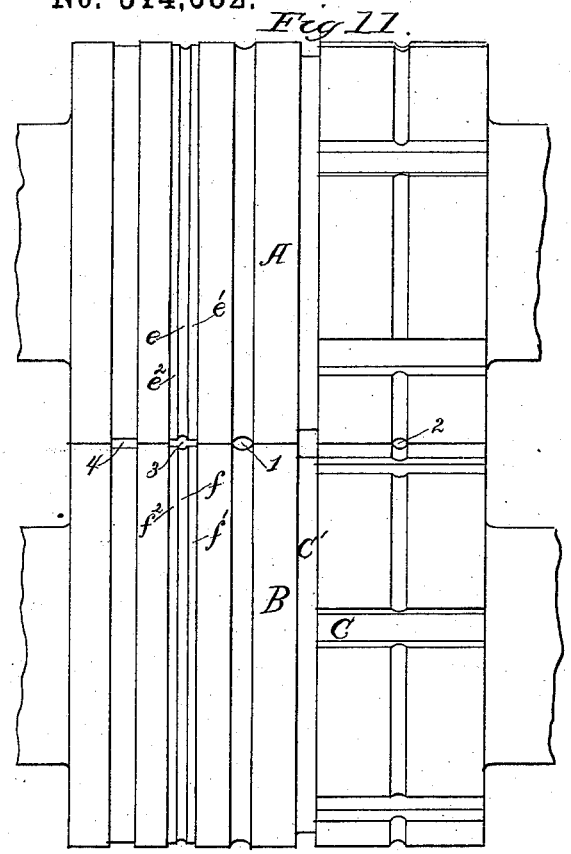
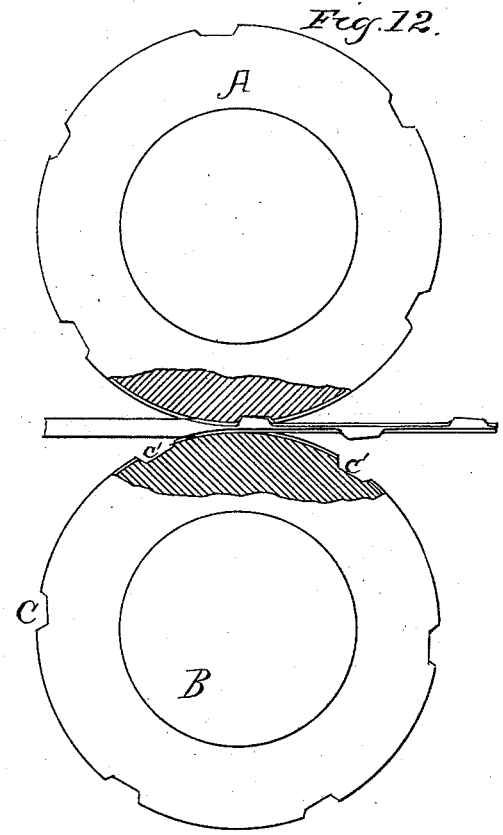
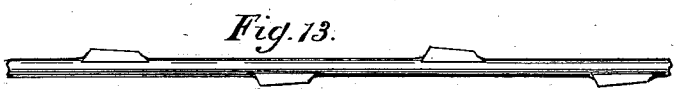
Fig. 13.
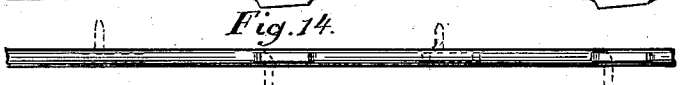
Fig. 14.
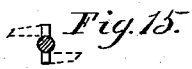
Fig. 15.
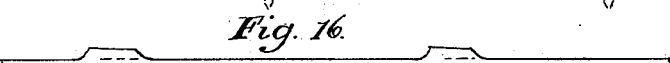
Fig. 16.
Fig. 18.
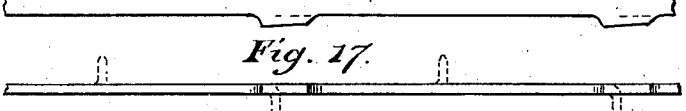
Fig. 17.
Witnesses: Inventor.

(No Model.)

F. H. TREAT.

3 Sheets—Sheet 3.

ROLLING MILL FOR ROLLING LEAFED WIRE FOR THE MANUFACTURE OF BARBED WIRE.

No. 314,082. Patented Mar. 17, 1885.

Witnesses:

Inventor.
Francis H. Treat
by his attorney

UNITED STATES PATENT OFFICE.

FRANCIS H. TREAT, OF JOLIET, ILLINOIS, ASSIGNOR OF ONE-HALF TO HORACE S. SMITH, OF SAME PLACE.

ROLLING-MILL FOR ROLLING LEAFED WIRE FOR THE MANUFACTURE OF BARBED WIRE.

SPECIFICATION forming part of Letters Patent No. 314,082, dated March 17, 1885.

Application filed April 28, 1882. (No model.)

*To all whom it may concern:*

Be it known that I, FRANCIS H. TREAT, a citizen of the United States, residing at Joliet, in the county of Will and State of Illinois, have invented certain new and useful Improvements in Rolling-Mills for Rolling Leafed Wire for the Manufacture of Barbed Wire; and I do hereby declare the following to be a full, clear, and exact description of the invention, such as will enable others skilled in the art to which it appertains to make and use the same.

My invention relates to the manufacture of that kind of barbed fence-wire the barbs of which are integral parts of the wire, and it is designed for the production of wire of substantially uniform gage throughout, provided with a row or rows of fins or leaves, by the subsequent shearing and bending of which leaves the required barbs can be formed.

To this end my invention consists of a rolling-mill the rolls of which are constructed with proper passes for converting blank rods or wire by gradual reduction into leafed wire.

In order that my invention may be clearly understood, I have illustrated in the annexed drawings several forms of two-high rolling-mills for the production of such leafed wire, as well as the wire in its various stages, and will proceed to describe the best form of such rolling-mills at present known to me.

Figure 1 is a longitudinal elevation of one set of two-high rolls. Fig. 2 is a partially-sectionized end elevation thereof, showing a rod undergoing rolling in one of the passes. Figs. 3 to 10 illustrate the rod or wire in its various stages.

Like letters of reference represent similar parts in all the figures.

A and B represent, respectively, the upper and lower rolls, which are constructed with suitable journals, and may be mounted and driven in any preferred known manner. The rolls are provided with corresponding grooves, $a$ and $b$, to form an oval pass, 1, by which round wire or rods, such as shown in Fig. 10, may be rolled to the oval form shown in Fig. 9 preparatory to the practice of my invention. The lower roll also contains near one end a continuous circular groove, $c$, of a more contracted uniform semi-oval contour than the groove $a$ therein, and the upper roll has a corresponding groove, $d$, in which there are, however, at determinate intervals depressions $d'$, the depth and contour of which are best seen in Fig. 2. In this instance the depressions are formed by longitudinal channels D, deeper than and intersecting the circular groove $d$. These channels extend from the end of the roll to a circular groove, D', the latter being provided to admit of the planing of the channels on a planing-machine. The grooves $c$ and $d$ $d'$ constitute pass 2 of the rolls. The transverse diameter of pass 2 is parallel to the axes of the rolls. The depressions $d'$ are arranged in line with the conjugate diameter of said pass, and have a somewhat inclined bottom. A third pass, 3, is formed by the corresponding circular grooves, $e$ $e'$ and $f$ $f'$, the portions $e$ and $f$ of which form the circular part of the pass, while the portions $e'$ and $f'$ form the lateral flat part thereof, as clearly shown in Fig. 1. A suitable guide is arranged in front of each pass, through which the rod or wire is entered, and by which it is held in the correct position with reference to the pass. As guides for similar purposes are in general use, and the application and arrangement thereof are well known, I deem it unnecessary to illustrate them.

In practically operating this rolling-mill, I take wire or rods of soft homogeneous material—such as low-carbon Bessemer steel or open-hearth steel—and convert the same by cold-rolling into the desired leafed wire. If the required kind of oval wire or rods (shown in Fig. 9) are not in the market, I take a round wire or rod, such as shown in Fig. 10, and roll it to this oval form by drawing it through pass 1. The oval wire or rod, Fig. 9, is then drawn edgewise, as shown in Fig. 2, through pass 2, and thereby rolled to the form shown in Figs. 6 and 6', in cross-section on line 5 6 in Fig. 7, and in cross-section on line 7 8 in Fig. 8. It will be observed that the partially-formed leaves are somewhat slanting—*i. e.*, their projection decreases somewhat from one end to the other. This is due to the inclination of the bottom of the depressions $d'$. The oval or elliptical wire or rod, provided at intervals with partially-formed leaves projecting at right angles to the transverse axis of the oval main stem, is then drawn through pass 3, the partially-formed leaves passing flatwise through the flat portion of the pass, while the oval main stem passes edgewise through the circular portion of the pass. This pass finishes the leafed wire, rolling it to a circular form of substantially uniform gage throughout, with a row of leaves projecting from one side of it, as clearly shown in Figs. 3 and 3', in cross-section on line 1 2 in Fig. 4, and in cross-section on line 3 4 in Fig. 5. The leaves are made tapering, so that when they are sheared off to near the base and bent, as indicated by dotted lines in Fig. 3, their outer ends will be somewhat pointed. The leafed wire thus produced should, before it is subjected to the final operations of converting it into barbed wire, be annealed.

Figs. 11 and 12 illustrate a set of two-high rolls for rolling leafed wire having two rows of leaves, as shown in Figs. 13, 14, and 15. To that end a circular groove, C', and longitudinal channels C are formed in the lower roll, B, to produce at proper intervals depressions c' in the circular groove c, and the pass 3 is provided with an additional flat portion, formed by the grooves $e^2$ and $f^2$ in the respective rolls.

If it be desired to form a flat-leafed wire, such as shown in Figs. 16, 17, and 18, a flat pass, 4, can be used to complete the wire, instead of pass 3.

Figure 20:
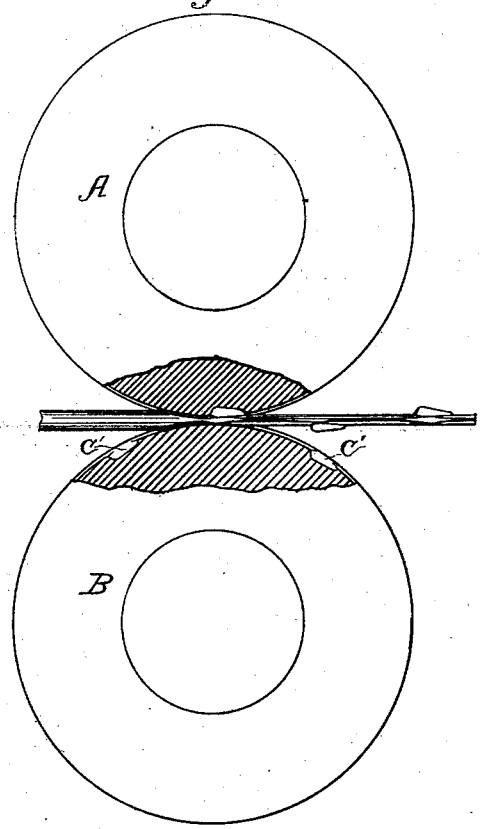
Figure 21:
Figure 23:
Figure 22:

I prefer to produce the depressions c' or d' by planing channels from the end of the roll to a circular groove therein, as heretofore described; but such depressions may be cut in the roll or rolls, as shown in Figs. 19 and 20. These rolls would produce leafed wire with two rows of leaves, such as shown in Figs. 21, 22, and 23.

The three sets of rolls illustrated, while differing in some details to meet different requirements, have one leading feature in common. This common feature is the semi-oval or semi-elliptical groove having depressions at intervals, which forms one half of pass 2 of each set of rolls, the other half of such pass being formed either by a plain semi-oval or semi-elliptical groove, or by a semi-oval or semi-elliptical groove having similar depressions at intervals, according as the rod is to be formed with one row or with two rows of leaves.

Having thus described my invention, what I claim is—

1. The combination, substantially as before set forth, of the roll provided with grooves c and $f f'$, and the roll provided with the groove d, having depressions d', and the groove e e'.

2. In a rolling-mill for rolling leafed wire, a roll provided with a circular groove intersected by deeper channels, whereby depressions are formed in such groove, substantially as before set forth.

3. In a rolling-mill for rolling leafed wire, a roll having a circular groove, d, provided at intervals with depressions d', and a circular groove, e, provided with a lateral flat portion, e', on one or both sides, substantially as before set forth.

4. In a rolling-mill for rolling leafed rods or wire, a roll having a uniform circumferential semi-oval or semi-elliptical groove the transverse diameter of which is parallel to the axis of the roll, and which is provided at intervals with depressions in line with its conjugate radius, substantially as before set forth.

5. In a rolling-mill for rolling leafed rods or wire, a roll having a uniform circumferential semi-oval or semi-elliptical groove the transverse diameter of which is parallel to the axis of the roll, and which is provided at intervals with depressions in line with its conjugate radius, the bottom of the depressions being inclined, substantially as before set forth.

In testimony whereof I affix my signature in presence of two witnesses.

FRANCIS H. TREAT.

Witnesses:
GEO. J. MUNROE,
S. O. SIMONDS.